(12) United States Patent
Dresel et al.

(10) Patent No.: US 6,170,019 B1
(45) Date of Patent: *Jan. 2, 2001

(54) MEANS SYSTEM AND METHOD FOR OPERATING AN APPARATUS

(75) Inventors: Holger Dresel, Altendorf; Georg Goertler, Baiersdorf, both of (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/988,178

(22) Filed: Dec. 10, 1997

(30) Foreign Application Priority Data

Dec. 10, 1996 (DE) .............................. 196 51 270

(51) Int. Cl.[7] .............................. G06F 15/163; G06F 9/00; G06F 9/46
(52) U.S. Cl. .......................... 709/304; 700/79; 700/108; 700/245; 714/47; 709/217
(58) Field of Search .................................... 709/218, 219, 709/224, 225, 229, 217, 228, 302, 303, 304; 713/201, 202; 700/79, 83, 108, 174, 245, 249, 250; 714/1, 47

(56) References Cited

U.S. PATENT DOCUMENTS

| | | | |
|---|---|---|---|
| 4,607,256 | * 8/1986 | Henzel | 340/825.52 |
| 5,572,652 | 11/1996 | Robusto et al. . | |
| 5,710,885 | * 1/1998 | Bondi | 395/200.54 |
| 5,742,762 | * 4/1998 | Scholl et al. | 395/200.3 |
| 5,752,246 | * 5/1998 | Rogers et al. | 707/10 |
| 5,796,606 | * 8/1998 | Spring | 364/138 |
| 5,826,029 | * 10/1998 | Gore, Jr. et al. | 395/200.57 |
| 5,857,191 | * 1/1999 | Blackwell, Jr. et al. | 707/10 |
| 5,898,835 | * 4/1999 | Truong | 395/200.49 |

FOREIGN PATENT DOCUMENTS

10124418A * 5/1998 (JP) .............................. G06F 13/00

OTHER PUBLICATIONS

Kador, The Ultimate Middleware, Apr. 1996, pp. 79–83.
Lexikon der Informatik und Datenverarbeitung.

* cited by examiner

Primary Examiner—Robert W. Beausoliel, Jr.
Assistant Examiner—Robert G. Crockett
(74) Attorney, Agent, or Firm—Schiff Hardin & Waite

(57) ABSTRACT

A device for operating an apparatus includes a server, a central monitoring module, an apparatus for communicating between the server and the monitoring module, a plurality of control, maintenance and/or monitoring programs and an apparatus for communicating between the control, maintenance and/or monitoring programs on the one hand as well the server and/or the monitoring module on the other hand. A browser can be connected to the device so that a system for the operation of the apparatus derives therefrom. A user interface with security-related functions or interactive functions can be realized easily and with little programming outlay as a result of the invention.

20 Claims, 3 Drawing Sheets

MEANS SYSTEM AND METHOD FOR OPERATING AN APPARATUS

BACKGROUND OF THE INVENTION

1. Field of the Invention

The present invention is directed to a means, a system and a method for operating an apparatus, particularly a complex medical apparatus such as, for example, a tomography apparatus or an angiography apparatus. The term "operating" with respect to this invention is to be understood in the broadest sense and includes, in particular, the control, adjustment, maintenance, adaptation and/or monitoring of the apparatus.

2. Description of the Related Art

Complex apparatus like those cited above require regular maintenance. Specific programs have been utilized for such maintenance, these programs making it possible—when used by the maintenance engineer—to implement measurements, set internal parameters or execute other functions.

Such specifically programmed maintenance applications, however, have little flexibility when the user interface is to be redesigned or some other computer platform is to be utilized. If remote maintenance of the apparatus is to be performed, a display rerouting must be set up at a high cost.

HTML documents (HTML=Hypertext Markup Language; text marking language with cross-reference functions) are a known user interface on, for example, the Internet. These HTML texts are retrieved from a WWW server (WWW=World Wide Web), loaded into a WWW browser and displayed by the latter, as is known.

This way of implementing a user interface, however, has only been used until now for simple and non-critical control tasks. Security-related or interactive functions, as are indispensable for the maintenance of complex systems, have not been capable of being realized or were only inadequately realized. A reliable access protection against unauthorized use, a reasonable handling of hardware faults, for example connection aborts, and the possibility of being able to interactively influence the execution of a program are thereby important aspects for such complex systems.

The meanings of the terms "browser" and "browsing" as used herein are presented on page 125 of the publication LEXIKON DER INFORMATIK UND DATENVERARBEITUNG, H. -J. Schneider, Ed., 3rd Edition, Oldenbourg Verlag, Munich 1991.

The article, "The Ultimate Middleware" by John Kador in the periodical BYTE, April 1996, pp. 79–83, describes the employment of services of the WWW (World Wide Web) as a replacement for what is referred to as "middleware" in order to interrogate central data banks. The structure of such systems is only superficially described. The use of middleware for operating an apparatus is not disclosed.

U.S. Pat. No. 5,572,652 discloses a work station computer wherein passwords are employed for different access authorization levels.

Pages 7–73 and 7–74 of the report, "Mikrocomputer in der Sicherheitstechnik" by H. Hölscher and J. Rader, Verlag TÜV Rheinland, Cologne 1984, describe a method of temporal program run monitoring wherein a "watchdog time" outputs an alarm or shuts the system off when it is not retriggered by a suitable program instruction within a predetermined time window.

SUMMARY OF THE INVENTION

Accordingly, the present invention is based on the object of solving these problems and providing a means, a system and a method in order to realize a user interface with security-related functions or interactive functions where the user interface is flexible and requires little programming outlay. In particular, standard modules should be utilized to a large extent in the user interface insofar as possible.

This and other objects and advantages of the intention are achieved by a device for operating an apparatus, including a server that is configured for sending data to a connectable browser and receiving data therefrom, a monitoring module, means for communicating between the server and the monitoring module, a plurality of control, maintenance and/or monitoring programs, and means for communicating between the control, maintenance and/or monitoring programs on the one hand as well as the server and/or the monitoring module on the other hand.

A system for the operation of an apparatus is also provided, including a device as set forth above and a browser connected to the server via an interface, the browser providing a user interface.

The present invention also provides a method for the operation of an apparatus, including the steps of: receiving a message deriving from a browser with a server; calling a program with the server; communicating by the program called by the server with a monitoring module; and calling or aborting a control, maintenance and/or monitoring program by the program called by the server or by the monitoring module.

The inventive means thereby comprises the server-side components of the system to which a known browser can be connected.

The invention is based on the fundamental idea of providing a central monitoring module (or "watchdog") at the server side that is informed of all significant events in the system and that realizes the desired functions in collaboration with the browser and the further system components.

The present invention makes it possible to also utilize the above-described technique of implementing a user interface with HTML documents for complex apparatus for which security-related functions or interactive functions are required. The invention can be utilized for all types of apparatus.

Since there are highly convenient development tools for HTML documents, the user interface can be directly designed as an HTML document by an HTML designer and can be easily modified as needed. The previously required step of programming the user interface is eliminated.

The data exchange between the server and the browser is possible in many ways via an interface. The browser can be connected locally to the apparatus, for example via a connecting cable. In the extreme case, the server and the browser are run as two processes on a single computer. A non-local connection (for example, a modem connection) is also possible without requiring individual programming because WWW servers and WWW browsers are already designed for use in a client-server mode from the very outset.

The invention preferably exhibits one or more of the following three aspects, which are not necessarily bound to the inventive system structure:

1. Access control to the individual apparatus functions,
2. Recognition of connection aborts, or crashes, and
3. Offering interactive functions.

For access control, server-side components of the system are preferably configured for implementing an authentication of the authorization of a user. To that end, the user enters his or her user name and a password. The user is granted access to the user interface only after a successful authentication.

Different access authorization levels can preferably be assigned to different users, so that, for example, specific functions can only be executed by users who are specifically authorized for the function. The apparatus to be operated can also be set to different enable levels. The HTML pages displayed for the user are preferably dynamically adapted to the user's access authorization.

The recognition of connection aborts, or crashes, preferably ensues in that the ongoing arrival of periodic message ("ping messages") sent by the browser is monitored. When the ping messages fail to arrive, all running processes are preferably aborted.

Interactive functions, which in particular include the possibility of being able to abort running processes at any time and with little delay, are preferably offered in that an interactive-bidirectional connection is maintained between the user interface and the running process via the monitoring module.

HTML documents are preferably employed for implementing the user interface; however, other page description languages can also be utilized. Likewise, other servers and browsers can be utilized instead of the known WWW servers and WWW browsers. The server preferably starts programs via a CGI interface (CGI=Common Gateway Interface, a standard interface in WWW servers for calling external programs) or in some other suitable way.

The inventive method is based on the fundamental principle of providing a program called by the server that exchanges data with the watchdog module and then executes a desired action. The aforementioned functions can thus be achieved with little programming outlay.

Further preferred developments of the invention are provided by a device which has the monitoring module configured for storing and continuously updating a directory of the respectively active control, maintenance and/or monitoring programs. The monitoring module and/or an authentication program called by the server is/are configured for implementing an authentication of a user.

A connection program called by the server is configured for implementing an inquiry at the monitoring module with respect to the authorization of a user for implementing one of the control, maintenance and/or monitoring programs and, as warranted, for starting this control, maintenance and/or monitoring program.

The monitoring module and/or a ping program called by the server is/are configured for identifying the failure of periodic ping messages received by the server to arrive and of subsequently causing that all active control, maintenance and/or monitoring programs are aborted. The monitoring module and/or an abort program called by the server is/are configured for initiating—as a reaction to an abort message received from the server—that at least one of the control, maintenance and/or monitoring programs as well as, potentially, an allocated connection program is aborted. The monitoring module and/or a program called by the server is/are configured for forwarding a message received by the server to an allocated control, maintenance and/or monitoring program. Preferable, the programs called by the server are CGI programs. The data sent and received by the server via the interface are HTML data in the preferred embodiment.

The system of a preferred embodiment provides that the browser is configured for implementing a ping process that periodically sends a ping message to the server.

In the method, an additional step is preferred, namely, updating a directory of the active control, maintenance and/or monitoring programs with the monitoring module.

BRIEF DESCRIPTION OF THE DRAWINGS

An exemplary embodiment of the invention that the inventors currently consider the best way of implementing the invention is described with reference to the drawings. A maintenance system for a medical apparatus is thereby involved.

DETAILED DESCRIPTION OF THE PREFERRED EMBODIMENTS

Figure 1:
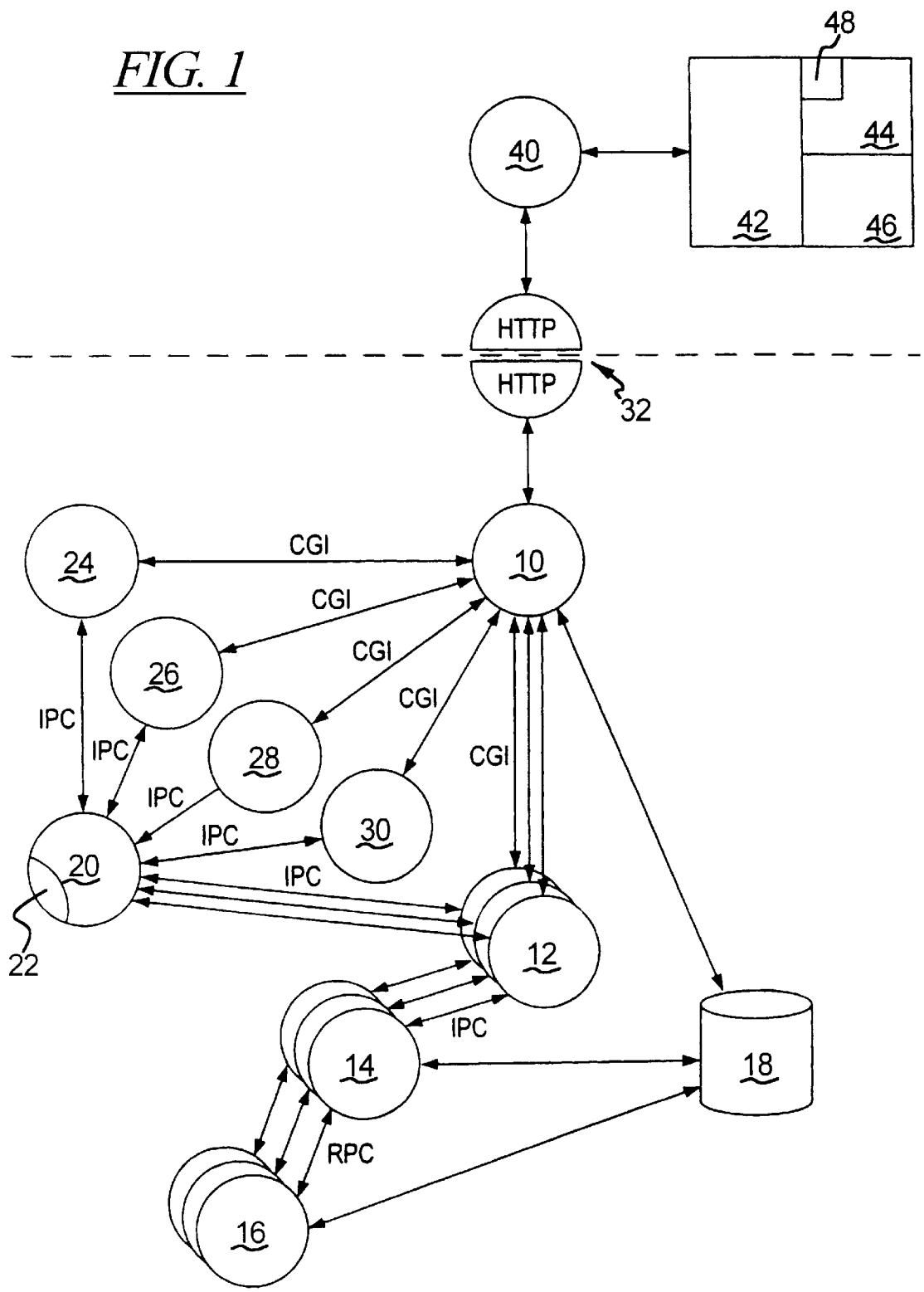
FIG. 1 is a dataflow diagram of the inventive system.

Below the broken line, FIG. 1 shows those components of the inventive system that are allocated to a central host computer 18 of the apparatus to be operated (server-side components). A WWW server 10 is capable of calling connection programs 12 via a CGI interface. The connection programs 12 in turn start maintenance programs 14 and are connected to these during the program execution via the IPC mechanism (IPC=Inter-process communication; communication between processes).

Each maintenance program 14 executes one or more maintenance functions and calls control programs of the apparatus to be operated via the RPC mechanism (RPC= remote procedure call; non-local procedure call). The control procedures 16 are parts of the control of the apparatus to be operated; for example, they serve for the implementation of measurements at hardware assemblies.

The server 10, the maintenance programs 14 and the control processes of the apparatus to be operated are connected to one or more data banks that contain global control data for the apparatus to be operated, maintenance results, handbook datafiles (help files), etc.

A central monitoring module 20 comprises a directory 22 of currently active programs (connection programs 12, maintenance programs 14 and other programs) and is connected by the IPC mechanism to the connection programs 12 as well as lo a start program 24, an authentication program 26, a ping program 28 and an abort program 30. The latter four programs are in turn called via the CGI interface of the server 10. In collaboration with the CGI programs 12, 24, 26, 28 and 30 and with the server 10, the monitoring module 20 executes a plurality of monitoring and administration tasks, these being described in greater detail below.

An interface 32 connects the server 10 to a WWV browser 40 that is shown above the broken line in FIG. 1. The connection between the server 10 and the browser 40 ensues via the HTTP protocol (HTTP=hypertext transfer protocol). In the exemplary embodiment described here, the browser 40 is locally allocated to the apparatus to be operated. In an alternative embodiment, the browser 40 is installed on an external computer, for example on a standard notebook computer that is connected to the server 10 via a PPP connection (PPP=point-to-point protocol). A protection against faulty transmission of manipulations can be achieved by checksums or by an encryption of the transmitted data.

The browser 40, for example that is known under the trademark "Netscape Navigator", is capable of displaying ASCII and HTML pages, of executing programs in JAVA and JAVASCRIPT and of communicating inputs of the user to the server 10. As its principal job, the browser 40 makes a user interface for the apparatus to be operated available by displays of a specific HTML maintenance page. Moreover, an online documentation as well as further programs can be called via the browser 40.

The HTML maintenance page displayed by the browser 40 is logically divided into a visible frame 42, a first static frame 44 hidden from the user, and a hidden, second static frame 46 with temporary content. The invisible frames 44 and 46 contain data, JAVASCRIPT programs and JAVA applets.

The HTML maintenance page is completely loaded into the browser 40 only a single time, namely at the beginning of the maintenance event. Later, only the visible frame 42 and the content of the second, static temporary frame 46 are overwritten. The static frame 44 is not overwritten during the maintenance event, so that the data stored in it are preserved. The information displayed in the visible frame 42 and stored in the first static frame 44 can be modified by suitable JAVASCRIPT programs, JAVA applets or other means. The second static frame 46 is loaded in order to modify variables and/or fields in the first static frame 44 and/or in the visible frame 42. Preferably, a new HTML page is loaded into the second static frame 46 with JAVA-script programs, JAVA applets or other means and is automatically executed. Above all, the HTML page is also dynamically generated by a CGI program. The advantage of the second static frame 46 is comprised therein that the complete frames 42 and 44 need not be transmitted from the server 10 for updating the visible frame 42 and the first static frame 44; rather, only the variables therein have to be set. Faster transmission times derive therefrom since only changes are transmitted. Moreover, a visible reloading of the visible frame 42, which is disturbing for the user, is avoided.

First, frequently required auxiliary programs are stored in the static, hidden frame 44; in this way, these do not have to be repeatedly loaded. Second, this frame serves the purpose of storing global values that should be preserved during the entire system running time, for example a session-dependent key that is transmitted to the browser 40 during the starting of the system. Third, this frame contains a ping process 48 as JAVASCRIPT program or JAVA applet that outputs periodic ping messages to the server 10. These components are described in greater detail below.

Figure 2:
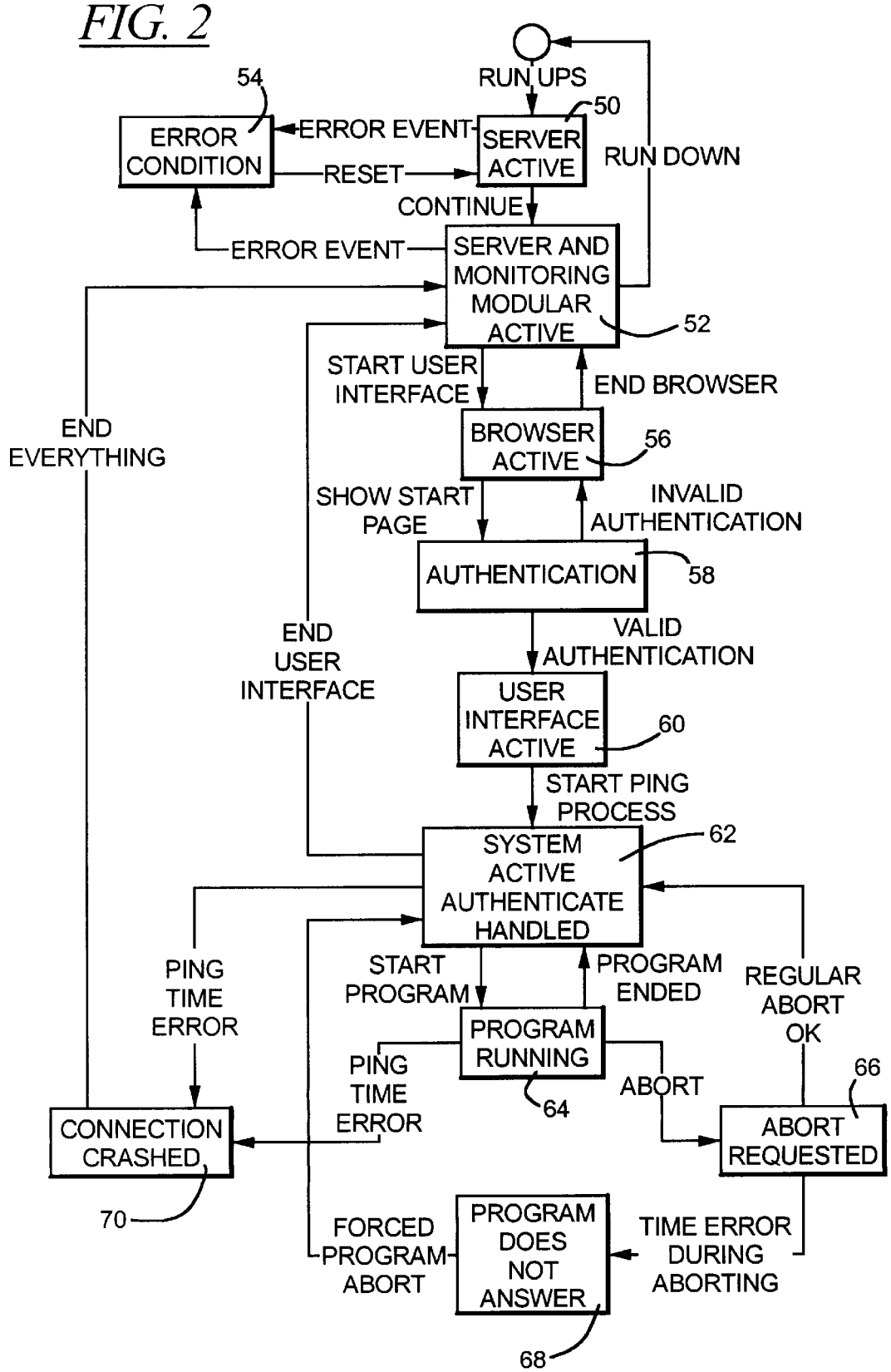
FIG. 2 is a status transition diagram of a typical execution of the inventive system.

The state transition diagram shown in FIG. 2 represents the states during the operation of the described exemplary embodiment and the events (transitions) that connected these states. When the system is brought up, the server 10 is started first and then the monitoring module 20 and, thus, the state 50 is run through and the state 52 is reached. The occurrence of an error leads to an error state 54 that can in turn be left by a manual resetting.

The browser 40 is called (at state 56) in response to a command of the user to start the user interface and the browser 40 sends a corresponding message to the server 10 via the interface 32. The server 10 subsequently calls the start program 24 that in turn informs the monitoring module 20 via IPC. Since the example presented here is a matter of a locally connected browser 40, the authentication of the user must still ensue. This information is returned to the server 10 that, in response thereto, communicates a general HTML start page to the browser 40 that is displayed to the user.

When the user would like to access the maintenance functions of the system from the general HTML start page, he must enter his user name and a password for the authentication (at the state 58). The browser 40 communicates these via the interface 32 to the server 10 and from the latter to the authentication program. The latter checks the input authentication data according to a plurality of criteria, potentially in consultation with further programs.

System-dependent, variable passwords with an adjustable validity duration are employed. Moreover, different access authorization levels are assigned to different users, so that specific functions can only be called by specifically authorized users. The possible functions for a user, moreover, are dependent on an enable level set at the apparatus to be operated that can be changed at any time. The monitoring module 20 has access to the respectively current enable level. For example, specific maintenance functions can be enabled only given a locally connected browser 40.

When the authentication is successful, the server 10 communicates the HTML maintenance page with which the user interface is implemented (at the state 60) to the browser 40. Further, the monitoring module 20 generates a session-dependent key that also indicates the access authorization level that was identified. This key is loaded into the temporary frame 46 in the form of a JAVA script and, potentially, of a JAVA applet, whereby the JAVA script or, respectively, correspondingly sets a variable contained in the static frame 44.

The browser 40 need not be locally connected to the browser 40. For example, the communication between the server 10 and the browser can ensue via a PPP modem connection in an alternative embodiment. The authentication of the user then already occurs upon setup of the PPP connection, so that no further password input is required for starting the user interface. This is determined by the start program 24 when starting the browser 40, this start program 24 seeing to it that the HTML maintenance page as well as the session-dependent key are directly communicated to the browser 40 (in the state 60).

The key stored in the static frame 44 of the HTML maintenance page influences the further execution of the maintenance event in a number of respects. First, JAVA script programs or JAVA applets that modify the configuration of the pages displayed to the user that depend on the access authorization level can be contained in the HTML datafiles communicated to the browser 40 from the server 10 during the further execution. For example, it can be provided that individual pages are only displayed in the visible frame or individual functions can only be selected by the user given that the user has the appropriate specific access authorization level. Moreover, the key is repeatedly transmitted to the server 10 and serves as password in the server. The actual user password therefore only has to be input once in the authentication, even when the server 10 requests a password more frequently. The server-side components of the system also employ the key in order to dynamically adapt the HTML data transmitted to the browser 40 to the access authorization of the user and to the momentary enable level of the apparatus to be operated.

As the next step of the system execution, the ping process transmitted to the browser 40 with the static, hidden frame 44 is started and the state 62 is thus reached. From now on, the ping process continuously sends ping messages to the server 10 via the interface 32 at predetermined time intervals. Each received ping message effects a calling of the ping program 28 via the CGI interface of the server 10, which in turn sends a corresponding message to the monitoring module 20 via IPC. The evaluation of the received ping messages shall be discussed later.

In the central state 62, suitable information are displayed for the user in the visible frame and options are provided for selection depending on the access authorization level of the user and the enable level of the apparatus to be operated. In particular, the user can start a maintenance program 14 by selecting a corresponding option. Given this event, which is shown in greater detail in FIG. 3, the browser 40 sends a suitable message to the server 10 (data stream 80), as a result whereof a connection program 12 is called (data stream 82). First, this inquires of the monitoring module 20 (data stream 84) whether the user has the authorization to execute the requested maintenance program 14. This authorization depends of the access authorization level of the user and on the enable level of the apparatus to be operated.

When the user is authorized (data stream 86), the connection program 12 starts the selected maintenance program 14 (data stream 88) and reports its process indicator to the monitoring module 20 (data stream 90). The monitoring module 20 notes this process indicator in the directory 22. The state 64 shown in FIG. 2 has thus been reached. In the described exemplary embodiment, however, the states 62 and 64 are not strictly separated since, as shown in FIG. 1, it is possible to start a plurality of maintenance programs 14 and have them run in parallel or quasi-parallel.

Figure 3:
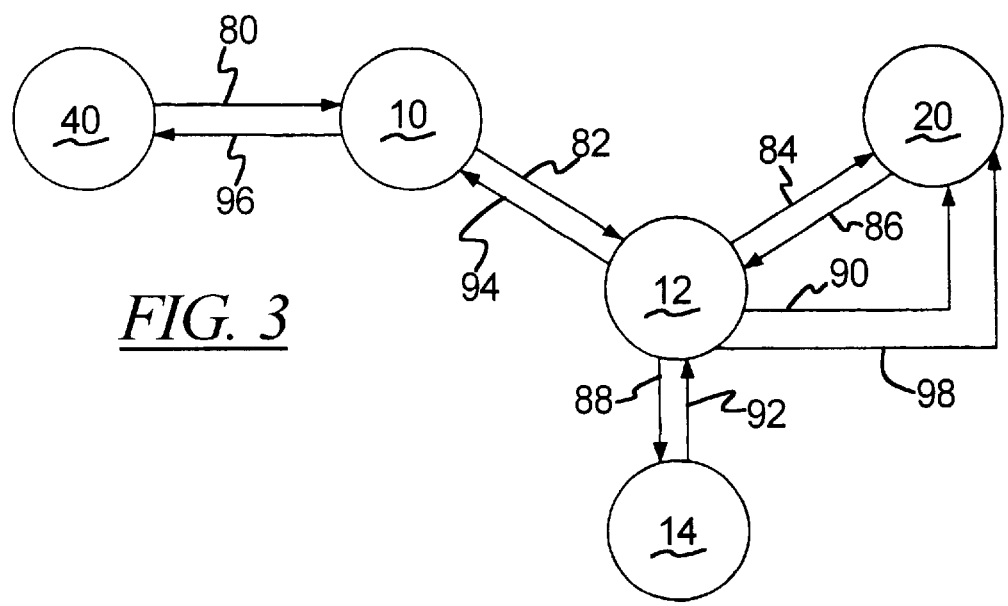
FIGS. 3 and 4 are dataflow diagrams when starting and aborting a maintenance program.

When the maintenance program 14 ends without the user having given an abort command, then this is reported to the connection program 12 (data stream 92 in FIG. 3). The end status of the maintenance program 14 is forwarded via the server 10 to the browser 40 (data streams 94 and 96). Moreover, the connection program 12 informs the monitoring module 20 (data stream 98), which deletes the program indicator of the ended maintenance program 14 from the directory 22.

Figure 4:
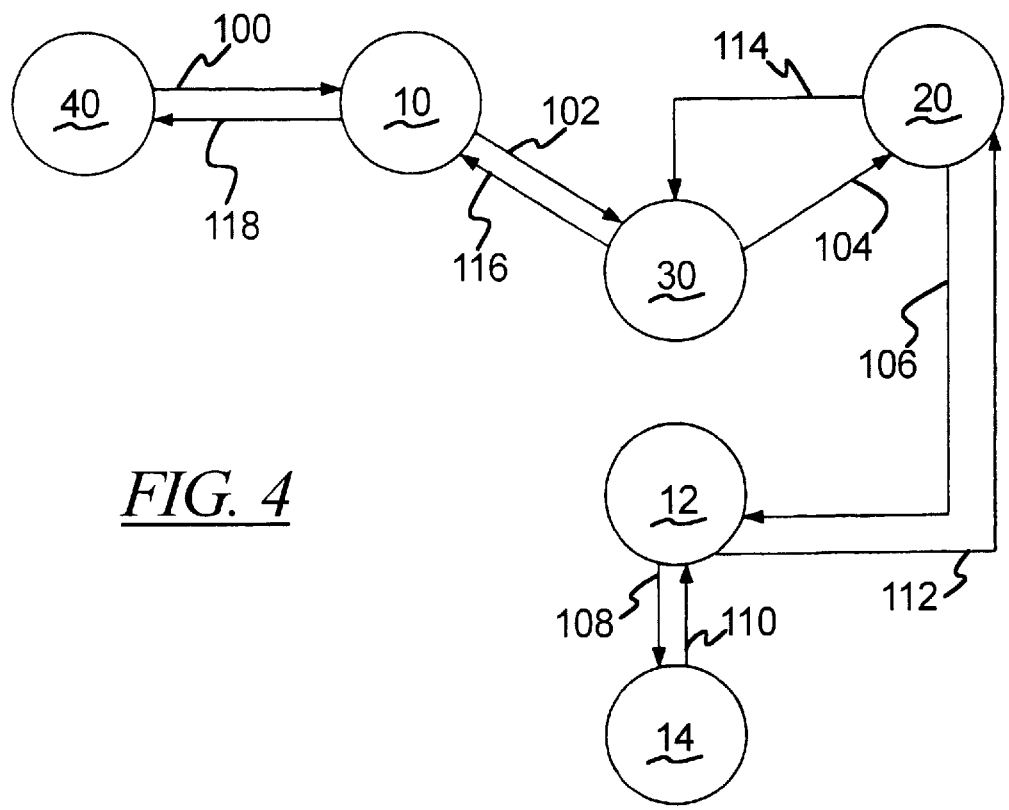

In addition to the program end that was just described and that is effected by the maintenance program 14 itself, the user—by selecting an instruction area shown in the visible window 42—can give a command (such as an "abort command") for the regular abort of one, some or all maintenance programs 14 as well as the allocated connection programs 12. The programs are thereby "cleanly" terminated and ended. This operation is shown in greater detail in FIG. 4.

The abort command given by the user is again communicated to the server 10, then via the CGI interface to the abort program 30 and from the latter to the monitoring module 20 (data streams 100, 102 and 104). When, for example, a single maintenance program 14 is to be aborted, then the monitoring module 20 identifies its process indicator as well as the appertaining connection program 12. A suitable abort request is then sent to this connection program 12 and to the maintenance program 14 (data streams 106 and 108). The state 66 in FIG. 2 is thus reached.

When the maintenance program 14 correctly reacts to the abort request, then it ends itself and it also potentially ends an allocated control process 16 and reports this to the connection program 12 (data stream 110), which in turn informs the monitoring module 20 (data stream 112) and the likewise ends itself. A time error in the abort is recognized when the abort confirmation does not arrive at the monitoring module 20 within a predetermined time span (state 68 in FIG. 2). In this case, the monitoring module 20 implements a forced program abort in that it send a corresponding command (referred to as a "kill" command) to the connection program and to the maintenance program 14.

The result of the regular or forced abort is reported from the monitoring module 20 to the abort program 30, to the server 10 and to the browser 40 (data streams 114, 116 and 118). The monitoring module 20 thereby deletes the aborted program from its directory 22.

The mechanism presented here with reference to the example of a program abort can be generally employed in order to communicate input data to running maintenance programs 14 and, thus, to allow an interactive operation of a program via a browser 40. The basic principle is thereby to route the input data to the monitoring module 20 via a program called by the server 10, preferably a CGI program. The latter thereby identifies the momentarily active program for which the input data are intended and routes them thereto, potentially via a connection program allocated to this program.

While the maintenance program is active and the ping process 48 of the browser 40 is running, i.e. in the states 62 through 68 shown in FIG. 2, the monitoring module 20 continuously checks whether the most recently received ping message lies no longer than a predetermined time duration in the past. A failure of the ping messages to arrive at the monitoring module 20 (ping time error) indicates a malfunction, typically a crash of a computer, a program abort or a loss of the communication connection between the server 10 and the browser 40 (state 70).

When the monitoring module 20 recognizes a ping time error, then it ends all active connection programs 12 and maintenance programs 14 in the above-described way, as though the user had given a command for the regular abort of all active programs. The system switches into the state 52 and waits for a new start instruction.

In the described system, the monitoring module 20 is a central process that has access to all information about the current system status. The monitoring module 20 can therefore fulfill a number of other tasks. For example, the enable level of the apparatus to be monitored can change during the maintenance event. The monitoring module subsequently decides which of the maintenance programs 14 that are active at the time can continue to be executed. As warranted, the monitoring module 20 aborts the maintenance programs that are no longer authorized to run in the way presented above.

The inventive system, which is provided as maintenance system for a medical apparatus in the exemplary embodiment described here, can likewise be utilized for the control, adjustment, maintenance, adaptation or monitoring of all types of technical apparatus. All suitable communication means, for example the Internet or an intranet as well, can be utilized for the connection between the server 10 and the browser 40.

Although other modifications and changes may be suggested by those skilled in the art, it is the intention of the inventors to embody within the patent warranted hereon all changes and modifications as reasonably and properly come within the scope of their contribution to the art.

We claim:

1. A device for operating an apparatus, comprising:

a server that is configured for sending data to a connectable browser and receiving data therefrom, a monitoring module, means for communicating between said server and said monitoring module, a plurality of control, maintenance and/or monitoring programs, and means for communicating between said control, maintenance and/or monitoring programs and one of said server and said monitoring module, wherein said device is configured for starting a user session by a user authentication procedure, and wherein said device is configured for starting and running more than one of said plurality of control, maintenance and/or monitoring programs in parallel or quasi-parallel during said user session, and wherein said monitoring module is configured for storing and continuously updating a directory of the control, maintenance and/or monitoring programs that are respectively active in the current user session, wherein said monitoring module is further configured for interactively communicating input data to at least one of said plurality of control, maintenance and, or monitoring programs or interactively aborting at least one of said plurality of control, maintenance and/or monitoring programs during said user session as a reaction to a corresponding input data or abort message received from said server.

2. A device as claimed in claim 1, wherein said monitoring module is configured for implementing said user authentication procedure.

3. A device as claimed in claim 1, further comprising:
an authentication program called by said server implementing said user authentication procedure.

4. A device as claimed in claim 3, wherein said authentication program called by said server is a CGI program.

5. A device as claimed in claim 1, further comprising:
a connection program called by said server configured for implementing an inquiry at the monitoring module with respect to authorization of a user to start one of said control, maintenance and/or monitoring programs and for starting said control, maintenance and/or monitoring program as warranted.

6. A device as claimed in claim 5, wherein said connection program called by said server is a CGI program.

7. A device as claimed in claim 1, wherein said monitoring module is configured for identifying failure of periodic ping messages received by said server to arrive and of subsequently causing all active control, maintenance and/or monitoring programs to be aborted.

8. A device as claimed in claim 1, further comprising:
a ping program called by said server for identifying failure of periodic ping messages received by said server to arrive and of subsequently causing all active control, maintenance and/or monitoring programs to be aborted.

9. A device as claimed in claim 8, wherein said ping program called by said server is a CGI program.

10. A device as claimed in claim 1, wherein said monitoring module is configured for initiating that at least one of said control, maintenance and/or monitoring programs is aborted as a reaction to an abort message received from the server.

11. A device as claimed in claim 10, wherein said monitoring module aborts a connection program in reaction to said abort message received from the server.

12. A device as claimed in claim 1, further comprising:
an abort program called by the server for initiating that at least one of said control, maintenance and/or monitoring programs is aborted as a reaction to an abort message received from the server.

13. A device as claimed in claim 12, wherein said abort program called by said server is a CGI program.

14. A device as claimed in claim 1, wherein said monitoring module is configured for forwarding a message received by said server to a respective one of said control, maintenance and/or monitoring programs.

15. A device as claimed in claim 1, further comprising:
a forwarding program called by the server for forwarding a message received by said server to a respective one of said control, maintenance and/or monitoring programs.

16. A device as claimed in claim 15, wherein said forwarding program called by said server is a CGI program.

17. A device as claimed in claim 1, further comprising:
an interface through which said server sends and receives HTML data.

18. A system for operating an apparatus, comprising:
a device including:
a server that is configured for sending data to a connectable browser and receiving data therefrom,
a monitoring module,
means for communicating between said server and said monitoring module,
a plurality of control, maintenance and/or monitoring programs, and
means for communicating between said control, maintenance and/or monitoring programs and one of said server and said monitoring module; and
a browser connected to said server via an interface, said browser providing a user interface;

wherein said device is configured for starting a user session by a user authentication procedure, and wherein said device is configured for starting and running more than one of said plurality of control, maintenance and/or monitoring programs in parallel or quasi-parallel during said user session, and wherein said monitoring module is configured for storing and continuously updating a directory of the control, maintenance and/or monitoring programs that are respectively active in the current user session, wherein said monitoring module is further configured for interactively communicating input data to at least one of said control, maintenance and, or monitoring programs or interactively aborting at least one of said control, maintenance and/or monitoring programs during said user session as a reaction to a corresponding input data or abort message received from said server.

19. A system as claimed in claim 18, wherein said browser is configured for implementing a ping process that periodically sends a ping message to said server.

20. A method for operating an apparatus, comprising the steps of:
starting a user session by a user authentication procedure between a browser and a server;
receiving a message deriving from said browser with said server;
calling a program with said server;
communicating by the program called by the server with a monitoring module; and
calling or aborting a control, maintenance and/or monitoring program by one of the program called by the server and the monitoring module;
wherein a plurality of control, maintenance and/or monitoring programs can be started and run in parallel or quasi-parallel during said user session; and
wherein said monitoring module stores and continuously updates a directory of the control maintenance and/or monitoring programs that are respectively active in the current user session wherein said monitoring module is further configured for interactively communicating input data to at least one of said plurality of control, maintenance and, or monitoring programs or interactively aborting at least one of said plurality of control, maintenance and/monitoring programs during said user session as a reaction to a corresponding input data or abort message received from said server.

* * * * *